March 10, 1964     O. MAISCH     3,124,375
INTERNAL TUBE SEAL AND CONNECTOR
Filed Aug. 9, 1960
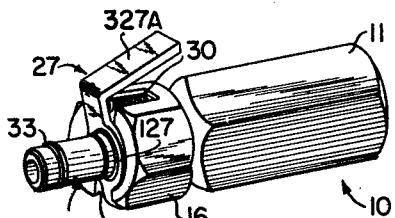
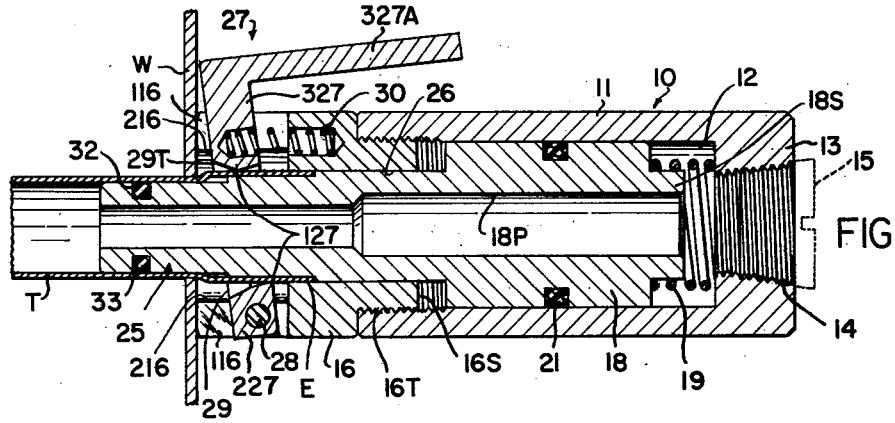
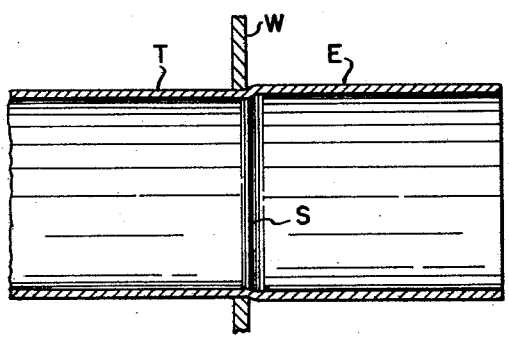
INVENTOR.
OLIVER MAISCH
BY
ATTORNEYS United States Patent Office 3,124,375
Patented Mar. 10, 1964

3,124,375
INTERNAL TUBE SEAL AND CONNECTOR
Oliver Maisch, Chicago, Ill., assignor to Tuthill Pump Company, Chicago, Ill., a corporation of Illinois
Filed Aug. 9, 1960, Ser. No. 48,488
1 Claim. (Cl. 285—317)

This invention relates to the temporary sealing of tube ends for testing and like purposes.

In the production of refrigerating apparatus and heat exchanger components as well as in other tubular assemblies it is common practice to temporarily seal the ends of the tubes at one or more points in the manufacturing processes so that relatively high testing pressures may be applied to the tubes to make sure that leaks have not developed therein. Since the pressures used for testing purposes are relatively high, it is necessary that the testing device or connector be anchored on the end portion of the tube and that means be provided in the connector for developing seal that is sufficiently tight to withstand the high pressure that is to be applied.

In my prior Patent No. 2,819,733, patented January 14, 1958, a tube seal and connector is disclosed that is highly efficient in most of the situations encountered in the sealing and testing of tubes, but in the use of the tube seal and connector of my aforesaid prior patent, it is necessary that a substantial length of the end portion of the tube be exposed so that the tube may extend for a considerable distance into the body of the connector. It has been found, however, that in certain instances the necessary length of the end portion of the tube is not located in an exposed relation, and in such instances connectors of the kind disclosed in my aforesaid patent cannot be used. One instance that has been found to be particularly troublesome is encountered in heat exchangers where the ends of the tubes of the heat exchangers are projected through an outer wall of the heat exchanger, and the tube is expanded or offset on the outer side of the wall to provide what amounts to a connector cup that is to be used in subsequent manufacturing operations for connecting the heat exchanger in the refrigerating system. This expanded or offset portion of the tube is relatively short, being in most instances of a length equal to about 1¼ to 1½ times the diameter of the expanded portion, and the internal diameter of the expanded or offset portion is usually equal to the normal outer diameter of the tube so that a tube end made from the same original diameter of tube may be inserted into the socket or cup for association therewith in the usual manner.

Where the exposed length of the offset end portion of the tube is so extremely short, the tube end cannot be extended into the inside of a tube seal and connector of the kind shown in my aforesaid patent, and it is the primary object of the present invention to provide a tube seal and connector that may be utilized efficiently in situations where a short length of the tube end is exposed.

Another and related object of this invention is to provide a tube seal and connector where highly efficient anchoring means cooperate with the exposed tube end, while sealing means of the O ring type cooperate with internal surfaces of the tube to produce the desired seal.

Other and further objects of the present invention will be apparent from the following description and claim, and are illustrated in the accompanying drawings, which, by way of illustration, show a preferred embodiment of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:
FIG. 1 is a perspective view of a tube seal and connector embodying the features of the invention;
FIG. 2 is a longitudinal sectional view of the device in position on an offset tube that is to be sealed;
FIG. 3 is a view similar to FIG. 2 showing the device when it has been partially associated with a tube; and
FIG. 4 is an enlarged longitudinal sectional view showing an offset tube of the kind adapted to be sealed by the present device.

For purposes of disclosure the invention is herein illustrated as embodied in a tube seal or connector 10. The tube seal and connector 10 is adapted particularly for cooperation with a relatively short expanded end E of a tube T, the tube T being extended through a wall W, and the end E being expanded or offset in a radial direction so that the internal diameter of the extended end E is substantially equal to or just slightly greater than the outer diameter of the tube T. The extended offset end E is normally quite short, in the order of 1¼ to 1½ times the diameter of the tube, and the connector 10 of the present invention is particularly suited to cooperate with tubes having such relatively short exposed ends that have been expanded or offset in the general manner shown in FIG. 4 of the drawings.

The tube seal and connector 10 has a body 11 within which an elongated cylinder 12 is formed. One end of the body 11 is closed by a cross wall 13 that has a threaded opening 14 formed axially therethrough so that a pressure connection may be made to the cylinder 12, and in those instances where such a pressure connection is not required, the opening 14 may be closed by a plug 15 that is shown in dotted outline in FIG. 2.

The other end of the cylinder 12 is closed by a head 16 that has a reduced threaded portion 16T that extends into the cylinder 12 in threaded relation thereto and the inner end of which provides a shoulder 16S that faces toward the opposite end wall 13 of the cylinder.

Within the cylinder 12, a piston 18 is provided for longitudinal reciprocating movement, and a coil spring 19 acting between the wall 13 and the adjacent end of the piston 18 is centered by an axially projecting sleeve 18S urges the piston 18 in left hand direction toward the position shown in FIG. 3 of the drawing where the left hand end of the piston 18 engages the shoulder 16S. The piston 18 preferably has a flexible annular seal 21 mounted in an appropriate annular groove about the piston.

The piston 18 has a projecting pilot portion 25 formed axially thereof and extending to the left, as shown in the drawing, so as to extend slidably through an axial guide passage 26 that is formed in the head 16. The specific form and functioning of the pilot portion 25 will be described hereinafter. The piston 18 and the pilot 25 have a central passage 18P therethrough so that pressure may be applied either through the opening 14 or from the other end of a tube.

The head 16 carries anchoring means which are shown as being of the same general kind that are illustrated in my aforesaid prior patent, and in this connection it will be noted that the head 16 has a transverse slot 116 formed therein and is recessed as at 216 in a concentric relationship to the passage 26. This enables an anchoring device 27 to be mounted on the head 16. The anchoring device 27 comprises a ring 127 with a lower lug 227 extended into the slot 116 near the lower edge of the head 16 as shown in FIG. 2, and a handle 327 which extends through the slot 116 at the opposite side of the head 16, as shown in FIGS. 1 to 3. The handle 327 in the present instance has a portion 327A extended at right angles to simplify engagement and operation of the handle. The lug 227 is pivoted by a slightly loose fit on a pin, while a spring 30 seated in opposed bores in the aforesaid head 16 and the handle 327 tends to pivot the clamp 27 toward its anchoring position shown in FIG. 2. The ring 127 of the clamp has an opening 29 formed therein, as shown best in FIG. 3, and this opening may be tapered as at 29T on its outer side. The opening 29T is just slightly larger than the offset end E of the tube T that is to be sealed by the connector, and this relationship will be described in detail hereinafter.

In the present instance the diameter of the opening 29 in the anchoring devices 27 is about .005" to .008" greater than the outer diameter of the exposed offset end E of the tube, and when the clamping device 27 is shifted to the position shown in FIG. 2, the tube seal connector 10 may be moved into the position shown in FIG. 2, after which the handle may be released and the anchoring device will rock slightly under the action of the spring 30 to assume a somewhat wedged relationship with respect to the tube end E.

The anchoring device 27 has its clamping or anchoring action increased in almost direct relation to the pressure that is applied through the action of the piston 18, as will be described in further detail hereinafter, and the sealing action with respect to the tube T is attained against the inner surface of the tube T by means carried on the projecting end of the pilot portion 25 of the piston. Thus, as will be evident in FIGS. 1 to 3, the pilot portion 25 of the piston has an O ring groove 32 formed therein, and an O ring 33 is mounted therein. This O ring 33 is proportioned in accordance with normal practice for high pressure sealing cooperation with the internal surfaces of the tube T. According to normal practices, the O ring must project an appreciable distance radially outside of or beyond the outer face of the groove 32, and ordinarily this projection would lead to cutting of the O ring 33 on the end edges of a tube when the pilot portion 25 of the tube sealer is inserted into the tube. In the present instance, however, it has been found that such projection of the O ring beyond the body of the pilot portion 25 does not cause destruction of the O ring, and this desirable feature is attained by reason of the fact that the pilot portion 25 of the device is sufficiently long so that the sealing action of the O ring 33 takes place in the normal diameter body portion of the tube T. Thus when the device 10 is being mounted on a tube, the O ring is first moved into the enlarged or offset end portion E of the tube, and as each mounting movement progresses, the O ring 33 is engaged with the sloping annular shoulder S of the tube so that the O ring moves into position within the normal diameter portion of the tube without engagement with sharp end surfaces of the tube.

The pilot portion 25 of the piston has its extreme end portion formed with an outer diameter just slightly less than the internal diameter of the normal portion of the tube T, and this small diameter end portion of the pilot 25 is indicated at 125 in FIG. 3 of the drawing. The diameter of the pilot 25 is then increased as at 225 to a diameter just slightly less than the internal diameter of the enlarged or offset end portion E of the tube, the portions 125 and 225 being defined by a shoulder 225S that faces to the left as shown in FIG. 3. Further to the right, as viewed in FIGS. 2 and 3, the diameter of the pilot 25 is further increased, as at 325, to a diameter that is substantially equal to the outer diameter of the enlarged portion E of the tube, and the portion 325 of the pilot 25 is snugly slidable in the passage 26. The length of the portion 325 is such that when the piston 18 is in its left hand position as shown in FIG. 3, the left hand end portion of the surface 325 is located just outside of, or to the left of the passage 26. At the left hand end of the portion 325, a shoulder 325S joins the portions 325 and 225, and in the operation of the tube seal and connector 10, the shoulder 325S engages the adjacent end of the enlarged portion E of the tube. It should also be pointed out that the length of the portion 225 of the pilot 25 is less than the length of the enlarged portion E so that the shoulder 225S cannot engage and weaken the shoulder S of the tube to which the device 10 is applied.

In the use and operation of the present tube seal and connector 10, the small portion 125 of the pilot 25 may be quickly and easily inserted into the large end E of a tube, and this may be accomplished without damaging the O ring 33 on the sharp edges of the tube. Then, as the mounting movement progresses from the relationship shown in FIG. 3 to that shown in FIG. 2, the O ring 33 engages the shoulder S and rolls freely into its sealing relationship within the normal diameter portion of the tube T as shown particularly in FIG. 2 of the drawing.

As this mounting operation progresses, the slightly larger portion 225 of the pilot moves into position within the enlarged end E of the tube, and the end edge of the tube T eventually is engaged by the shoulder 325S of the pilot. The mounting movement may be continued until the end of the head 16 engages the wall W, as shown in FIG. 2, and this locates the anchoring element 127 in a midportion of the expanded or offset end E of the tube. The handle 327 of the device is then released so that a preliminary wedging or anchoring action will be attained by rocking of the anchoring member toward the position shown in FIG. 3. Then, when pressure is applied within the tube T, either through the connecting opening 14 or through a connection to the other end of the tube, the shoulder 325S reacts against the end of the tube and the body 11 of the tube seal is urged in a right hand direction to produce an increased anchoring action with respect to the tube end E. The body 11 is thus held firmly in position on the expanded tube end E, and the desired sealing action is attained within the normal diameter portion of the tube T through the action of the O ring 33.

From the foregoing description it will be apparent that the present invention provides a new and improved tube seal and connection that is adapted for quick, easy, and efficient cooperation with the expanded or offset tube ends, and the device is particularly useful where the expanded tube ends are of relatively short length.

Thus, while a preferred embodiment of the present invention has been illustrated herein, it is to be understood that changes and variations may be made by those skilled in the art without departing from the spirit and scope of the appending claim.

I claim:

In a high pressure tube seal and connector for association with a relatively short projecting end of a metal tube, an elongated body having a longitudinal opening therethrough, a head at one end of said body having a longitudinal opening therethrough and a counterbore at one end of the head substantially larger than the tube end with which the connector is to be associated and into which counterbore such a tube end may extend, an anchoring ring disposed in said counterbore and pivoted at one edge on the head for shifting movement from a mounting position perpendicular to the counterbore axis to an angular position wherein said ring will engage and clamp onto a tube end that projects therethrough, spring means urging said ring toward its clamping relation, said body having a longitudinal cylinder formed therein, a piston reciprocable in said cylinder, a spring in said cylinder urging said piston toward said head, a pilot rigid with said piston and adapted to be inserted into such a tube end, and said pilot being extended through said counterbore and said anchoring ring and beyond said one end of the head, a filler portion forming part of said pilot and adapted to fill the end portion of a tube and react against the anchoring ring to prevent distortion of said end portion by said clamping ring, said pilot having a shoulder adapted to engage the end edge of the end of such a tube when the end portion of such a tube is disposed within said anchoring means, and an O ring seal on said pilot near the end thereof for sealing cooperation with the internal surface of the tube.

References Cited in the file of this patent

UNITED STATES PATENTS

| | | |
|---|---|---|
| 664,341 | Trommlitz et al. | Dec. 18, 1900 |
| 932,869 | Johnson | Aug. 31, 1909 |
| 1,078,112 | Storm | Nov. 11, 1913 |
| 1,150,420 | Davis et al. | Aug. 17, 1915 |
| 2,476,172 | Williams | July 12, 1949 |
| 2,512,041 | Steele | June 20, 1950 |
| 2,667,139 | Campbell | Jan. 26, 1954 |
| 2,707,387 | Zinn | May 3, 1955 |
| 2,819,733 | Maisch | Jan. 14, 1958 |
| 2,877,027 | Bagnell | Mar. 10, 1959 |

FOREIGN PATENTS

| | | |
|---|---|---|
| 707,570 | Great Britain | Apr. 21, 1954 |